Dec. 10, 1940.  E. S. WITCHGER  2,224,371
DOOR CLOSING DEVICE FOR AUTOMOTIVE VEHICLES
Filed July 24, 1939  2 Sheets-Sheet 1
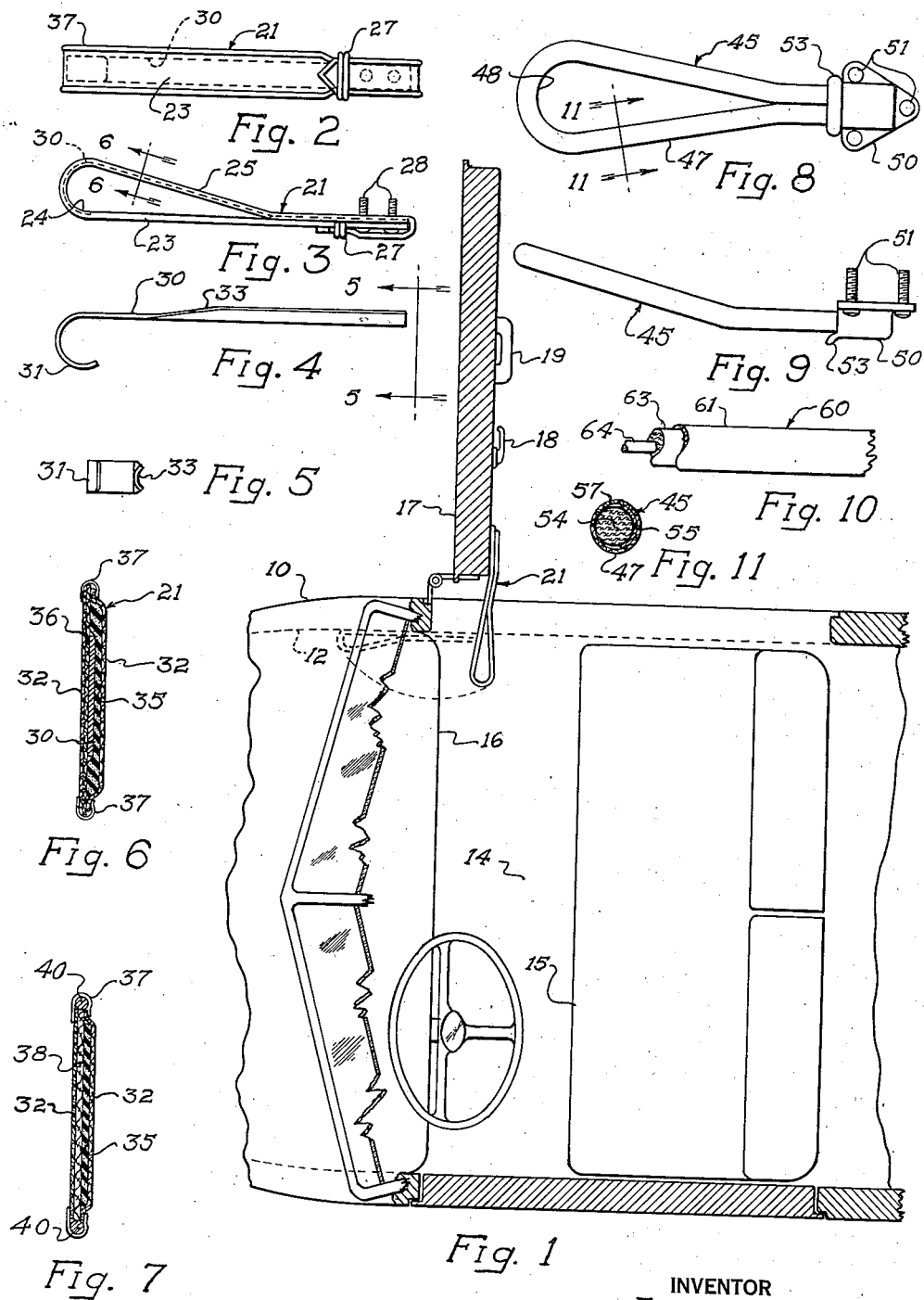
INVENTOR
EUGENE S. WITCHGER
BY John F. Stark
ATTORNEY Dec. 10, 1940.                E. S. WITCHGER                2,224,371
             DOOR CLOSING DEVICE FOR AUTOMOTIVE VEHICLES
                    Filed July 24, 1939          2 Sheets-Sheet 2
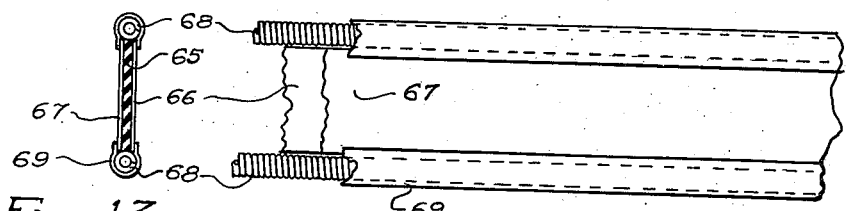
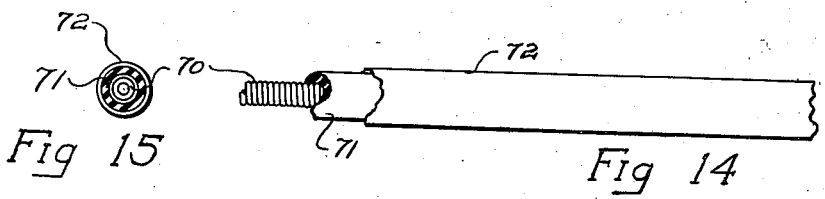
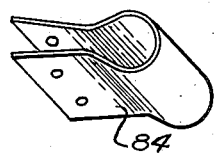
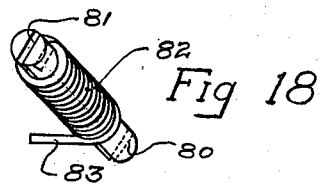
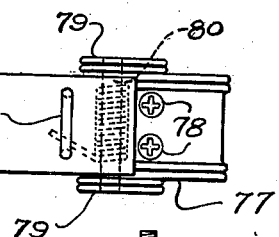
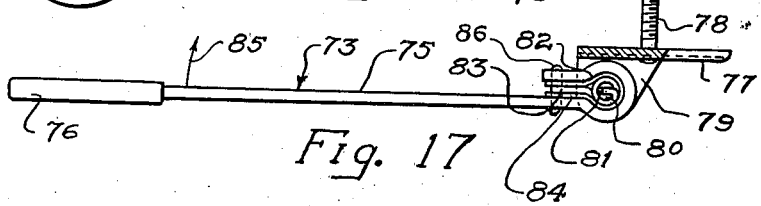
INVENTOR
EUGENE S. WITCHGER
BY John F. Stark
ATTORNEY Patented Dec. 10, 1940

2,224,371

UNITED STATES PATENT OFFICE 2,224,371

DOOR CLOSING DEVICE FOR AUTOMOTIVE VEHICLES

Eugene S. Witchger, Detroit, Mich., assignor of one-half to Clarence W. Shaw, Grosse Pointe Woods, Mich.

Application July 24, 1939, Serial No. 286,143

6 Claims. (Cl. 296—44)

This invention relates to door closing devices in general, and more particularly concerns a door closing strap for automotive vehicles.

Heretofore the average automotive vehicle body has not been so wide as to be unable to conveniently reach the right front door of the vehicle from the driver's seat. However, with the advent of the present day automobiles having much wider bodies providing for the convenient accommodation of the driver and two passengers on the front seat, it has become substantially impossible from the driving position in most vehicles to reach the front door opposite the driver's seat when it is in an open position. The usual means on vehicle doors that provide a hand-hold or grip for pulling the doors closed are the door latch handle or a combination padded arm rest apertured for reception of a hand hold when closing the door. While these means for assisting in closing the door are just about near enough to be reached from the driver's seat when the door is in a closed position the arcuate outward path described by the door in opening, places it far beyond reach of the average driver.

The need for a convenient means accessible from the driver's seat for closing the opposite front door of the vehicle assumes a positive utilitarian purpose under certain conditions. For example, consider a closed and locked vehicle body having a key lock in the usual position in the right front door, after unlocking the door and in entering the front compartment the driver must execute a combination of body sliding, coordination of door pulling movement and leg retraction from the door frame in closing the door and coming to rest in the driver's seat. Moreover the problem is not made any easier should the driver have on an overcoat or like article of apparel and the seat material be of mohair or upholstery material having a similar coefficient of friction. In this instance one hand must be used to keep the coat tails from sticking to the mohair covering and the other hand must be used to pull the door closed behind the driver as he moves transversely across the body and does a half turn to come to rest under the steering wheel on the driver's seat. The other method of closing the right front door by first being seated on the seat adjacent the door then closing the door and sliding over the seat to the driving position under the steering wheel is also objectionable for the above reasons. If a passenger is to occupy the other seat in the front compartment of course this last method is not possible and ordinarily the passenger would close the door, however, under some conditions if the party is aged or infirm the swinging of the relatively wide and heavy door is not easily accomplished, especially since the remaining doors and windows of the car are closed and the door must compress air in the body in closing, here courtesy requires that the driver assist in the operation under somewhat acrobatic movements in reaching across the passenger to pull the door closed. The present door closing device encourages drivers to enter from the curb side instead of entering from the street side, which is a safety feature. Accordingly, the primary object of the present invention is the provision of means for closing the right hand door in the front compartment of a vehicle body accessible from the driving position.

Other objects of the invention include the provision of a vehicle door closing means comprising a fabric strap including a hand-hold on the inner end and attached at its outer end to the door adjacent the inner hinged edge thereof; the provision in a door closing means as above described of a reinforced fabric covered strap so constructed and arranged as to project inwardly into the vehicle body when the door is in an open position and to lie in substantial parallelism with the inner face of the door body and retain its lateral stability against sagging over a long period under repeated stressing without fatigue; the provision in a door closing device as above described of a reinforced fabric covered strap including a spring member therein normally yieldably tensioning the strap to the inner plane face of the door body and when displaced therefrom in a door closing operation to thereafter return to its original position.

Further objects of the invention include the provision of a vehicle door closing strap comprising an upholstered member formed with a hand-hold on its inner end and secured to the inner face of the door with respect to the lateral edges thereof so that at least the hand-hold portion thereof extends into the vehicle body when the door is in an open position, and so located with respect to the longitudinal edges of the door that the strap passes under the lower edge of the vehicle instrument panel and lies against the inner wall of the vehicle body when the door is closed; the provision in a vehicle door closing means as above described, of a strap including a hand grip thereon which in the door open position is closer to the driver's hand than in the door closed position.

The present invention is characterized by further and other advantages which reside in the novel combination and arrangement of parts which will become apparent as the description progresses and is disclosed in the accompanying drawings forming a part of this specification, and in which:

Fig. 1 is a sectional plan view through a portion of a vehicle body and embodying one form of door closing means this invention may assume; and Figs. 2 and 3 are elevational and plan views, respectively, of the upholstered strap removed from the vehicle; and Fig. 4 is a plan view of the reinforcing spring member removed from the strap; and Fig. 5 is an end elevational view thereof as on the line 5—5 of Fig. 4; and Fig. 6 is a vertical sectional view through the strap body as on the line 6—6 of Fig. 3; and Fig. 7 is a similar view of a modified cross section.

Figs. 8 and 9 are elevational and plan views, respectively, of a modified form of door closing cord and mounting bracket; and Fig. 10 is an enlarged partial elevational view of the cord member with portions broken away to reveal its build-up; and Fig. 11 is a vertical cross sectional view through the strap member as on the line 11—11 of Fig. 8.

Figs. 12 and 13 are elevational and cross-sectional views, respectively, of a further modified structure; and Figs. 14 and 15 are similar views of another modified structure embodying a coiled reinforcing spring.

Fig. 16 is an elevational view through another strap structure including a spring-pressed pivotal mounting therefor; and Fig. 17 is a plan view, sectioned in part, through the mounting bracket, and adjacent structure of Fig. 16, and Figs. 18 and 19 are perspective views of the hinge pin and torque spring wound therearound, and the sleeve bushing fitted thereover, respectively.

In the drawings, particularly Figs. 1-6, inclusive, a vehicle body generally designated 10, includes an inner body wall 12, a front compartment 14, a front seat 15 and an instrument panel 16. A right front door 17 remote from the driver's side has a door latch release member 18 and a conventional combination padded arm rest 19 and apertured hand-hold therein and ordinarily used to pull the door closed.

Attached to the inside face of the door adjacent its hinged edge is an upholstered strap member, generally designated 21. This strap may comprise a body portion 23 of relatively thin flat cross section bounded by marginal beaded edges and bent back upon itself to form a hand grip 24 and terminating in a back piece 25 having a reverse bend around the edge of the body member 21 which is secured under the medallion 27. Within the reverse bent portion are concealed suitable fastening means 28 which extend through the body portion 23 and the back piece 25 and are adapted for threading into the body of the door 17. A spring metal member 30 has a straight body portion terminating in an arcuate end section 31 adapted to fit within the back piece 25 and the hand grip 24 of the strap 21. The spring metal member 30 has an arched or cambered cross section 33 in its straight body portion which tapers out to a substantially flat cross section adjacent the arcuate end section 31. This spring member is thus relatively stiffened against lateral and longitudinal sagging and distortion in use.

In the cross section of Fig. 6 will be seen the build-up of the upholstered strap 21. Beginning with the spring member 30 a filler section 35 of sponge rubber or similar substance is positioned against one side thereof and has a width greater than the spring member to cover the metal edges thereof. Upon the opposite or back face of the spring member 30 a second filler piece 36 of fabric is positioned, which is preferably heavy canvas duck or the like, and is coextensive in width with filler section 35. Upon the outer side of each filler member is an envelope of upholstery material providing a finished surface or, as shown, separate front and back sections of lace upholstery material or the like, fastened under marginal bead members 37 upon the top and bottom edges which may be finished as desired to form a finished edge.

In Fig. 7 is shown a cross section of similar shape but employing a slightly different core. In this instance flat web member 38 is of heavy duck and has marginal upper and lower edges of spring wire reinforcements 40 providing lateral stability to the strap and affording elastic means for restoring the strap to its original set after repeated stressing in use. The remaining structure of the strap, that is, the rubber pad 35, outer upholstered lace members 32, and the marginal molded bead members 37 are stretched over the wire reinforcements 40 to provide a finished section as in the previous member.

In use, the previously described constructions are secured to the door by suitable threaded fastening means 28 as shown in Figs. 2 and 3, so as to extend into the passenger compartment closer to the driver's seat when the door is in an open position than when the door is in a closed position, in which, due to the location between the longitudinal edges of the door the strap clears the lower edge of the instrument panel and lies against the inner wall 12 of the vehicle body out of the way. If the door 17 of the front compartment 14, of the vehicle 10, farthest from the driver is open and the driver is in the driving position on the front seat 15 and wishes to close the door, he merely reaches out, grips the looped body of the strap 21 in the hand-hold and pulls the door. In this operation the door moves on an axis about its hinge pins while the strap is angularly distorted away from the plane of the inner face of the door and toward the driver as the door describes its arcuate path in closing, thus the strap will be displaced from its initial curvature but, due to the elastic properties incorporated in the section of the strap body, will quickly return to its original arched position.

Now having reference to Figs. 8 to 11, inclusive, there is shown another modified form of door closing strap, generally designated 45, according to the present invention. In this instance the strap 45 is comprised of a body member 47 substantially circular in cross section and looped upon itself to form the hand-hold 48 with the opposite ends thereof secured under a fitting or bracket 50 including threaded fastening means for mounting the structure to the vehicle door, as previously. It will be noted that the cross section of the strap body 47, as shown in Fig. 11 comprises an inner core of rope 54, a reinforcing spring metal section 55, and an outer concentric envelope of upholstery lace 57, while from Fig. 9 it is apparent that the strap has been given an initial bend or set so as to have it normally disposed flush with the inner face of the door 17 when mounted thereon. The bead or rounded lip 53, of the bracket 50, permits rather sharp bends of the strap 45 in the door closing operation over the edge of the bracket without danger of exceeding the elastic limit of the enclosed spring metal reinforcement 55 of the strap body. In Fig. 10 the rounded strap body, generally designated 60, comprises an annular outer section 61 of upholstered material, and inner concentric cotton rope 63 having a core of spring wire 64 embedded therein.

In Figs. 12 and 13 is shown a further modification of a door closing means according to the teaching of this invention. The portion of the strap body in this instance comprises an inner elongated rectangular pad 65 of sponge rubber or the like over which on either face is secured an intermediate layer of soft top cloth 66 and an outer layer of body trim cloth or upholstery material 67. Upon the upper and lower marginal edges of the rubber pad 65 are closely coiled helical spring members 68, and an outer bead or binding material 69 is secured thereover to form finished rolled edges. Of course, the section of the strap body shown is completed by forming a hand grip at one end and anchoring means at the opposite end for attachment to the vehicle.

In Figs. 14 and 15 a section of a strap body assuming the form of an annular cord is shown and which has an inner spring 70 forming a core similar to the spring 68 above described. However, in this construction the spring 70 is enveloped, or moulded in an intermediate rubber tube 71 which in turn receives an outer finished covering of trim lace or upholstering material 72.

The Figs. 16 to 19, inclusive, represents another form of this invention in which the door closing strap includes means in a combination hinge and mounting plate therefor, for yieldably tensioning the device to the vehicle door upon which it may be mounted. The strap generally designated 73 may comprise a substantially flat rectangular body 75 terminating at one end in the hand-hold 76 and adapted to be secured at the opposite end to the combination hinge and mounting plate. The strap body 75 may in this instance be rubber, fibre, or other suitable material able to support its own lateral weight without sagging, finished or covered with a surface as desired and without the use of a spring metal reinforcement therein, as will be presently apparent. The mounting plate 77 is suitably molded for harmonizing with the interior trim of the vehicle door to which it is attached by the threaded fastening means 78 carried by the plate. Laterally extending from the upper and lower edges of the plate are the bracket arms or journals 79 which are apertured for reception of a hinge pin 80. This hinge pin has a slot 81 therein for reception of one end of a torque spring 82 anchored therein, and having a free end 83 extending therefrom. Surrounding the intermediate portions of the hinge pin 80 and spring 82 between the journals 79 is a sleeve bushing 84, best shown in Fig. 19, which has a parti-circular bearing portion and spaced lateral flanges extending therefrom within the confines of which the free end 83 of the torque spring is adapted to be fixed by a staple member 86. This bushing 84 provides a bearing for the strap 75 on the spring 82 and pin 80 and in addition retains the free end of the torque spring in tensioned condition and distributes the spring torque uniformly over the full width of the strap body 75. The strap may be mounted on a vehicle door so as to project substantially beyond the hinged edge of the door, and so located longitudinally with respect to the upper and lower edges of the door as to pass beneath or just clear the lower edge of the vehicle instrument panel as the door describes an arcuate path in being opened or closed. The operation and use of this door closing strap is now believed obvious from the description and operation of the previous figures. Accordingly, it will now be apparent that by means of the hinged construction the strap may be displaced from the plane of the vehicle door in the door-closing operation and, by reason of the torque spring incorporated around the hinge pin constantly urging the strap in the direction of the arrow 85, will be automatically returned to its original position thereafter, as best shown in Fig. 1. Thus the present hinge construction permits the use of a simple rubber or fabric strap member 75 able to laterally support its own weight without sagging and accomplishes two functions previously effected by the spring metal reinforcements incorporated in the hereinbefore described figures, first, that of normally maintaining the strap resiliently pressed to the inner face of the door body; and second, the inherent action of the hinge providing a pivotal action about the hinge pin when the strap is displaced from the plane of the inner face of the door in a door closing operation, and an automatic return to its original position thereafter by reason of the torque spring included therein.

From the foregoing description of the several embodiments of the invention it will be apparent that the objects of the invention heretofore enumerated have been attained, and that a novel vehicle door closing device easily accessible from the driver's seat has been provided which comprises means for maintaining the device out of the way when not in use. While the invention has been described in several specific examples, it is not the intention to be limited to the particular construction shown, which may be varied in considerable detail for adaptation and modification in other structures without departing from the spirit of the broad invention, the scope of which is defined in the appended claims.

What I claim is:

1. In combination with a motor vehicle body including an instrument panel and a door, a door closing device mounted on said door and including an inner free end terminating in a hand hold extending under said panel and close to the adjacent body wall when the door is in a closed position, said device so constructed and arranged that opening movement of said door causes withdrawal of the free end of the attached device from under said panel transversely into the interior of the body when the door is in opened position, so that said hand hold is accessible to a driver of the vehicle from the driving position.

2. A door closing device for an automotive vehicle, comprising an upholstered body portion having a spring metal reinforcement therein and attached to the inner face of said door adjacent the hinged edge thereof, said spring metal member normally urging said body into the face of the door when in a closed position and arranged to extend said body portion transversely into the vehicle interior when in an open position.

3. A door closing device for an automotive vehicle, comprising an upholstered body portion having a spring metal reinforcement therein and attached to the inner face of said door adjacent the hinged edge thereof and extending therebeyond, said spring metal member normally urging said body into the face of the door when in a closed position and arranged to extend said body portion transversely into the vehicle interior when in an open position.

4. As a new article of manufacture a vehicle door-closing device, said door-closing device comprising an elongated elastic body urged toward the plane of said door having a hand-hold at one end and an attachment means at the opposite end thereof for mounting on the vehicle door adjacent its hinged edge and extending laterally beyond the marginal edges thereof.

5. A door closing device for a vehicle body, comprising an upholstered member secured to the inner face of said door and extending laterally beyond the hinged edge thereof, one or more yieldable stiffening portions in said upholstered member urging the longitudinal length thereof to said door, and said upholstered member adapted to project transversely into the vehicle body, when said door is in an open position.

6. In a vehicle body having one or more hinged doors, an assist strap for closing a door comprising a yieldable composite body folded upon itself to form a hand hold, means mounting said strap to the door adjacent its hinged edge, means integral with said mounting means limiting the distortion of said strap, and said strap so constructed and arranged as to project farther into the vehicle when the door is in an open position than when the door is in a closed position.

EUGENE S. WITCHGER.